United States Patent
Hou et al.

(10) Patent No.: US 12,483,323 B2
(45) Date of Patent: Nov. 25, 2025

(54) INDICATION METHOD AND INDICATION DEVICE

(71) Applicant: DATANG MOBILE COMMUNICATIONS EQUIPMENT CO., LTD., Beijing (CN)

(72) Inventors: Liming Hou, Beijing (CN); Bo Han, Beijing (CN); Shaoli Kang, Beijing (CN); Deshan Miao, Beijing (CN); Guojun Xiao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 614 days.

(21) Appl. No.: 17/789,701

(22) PCT Filed: Dec. 8, 2020

(86) PCT No.: PCT/CN2020/134556
§ 371 (c)(1),
(2) Date: Jun. 28, 2022

(87) PCT Pub. No.: WO2021/135858
PCT Pub. Date: Jul. 8, 2021

(65) Prior Publication Data
US 2023/0030149 A1    Feb. 2, 2023

(30) Foreign Application Priority Data

Dec. 30, 2019    (CN) .......................... 201911393963.1

(51) Int. Cl.
*H04B 7/185*    (2006.01)
*H04W 84/06*    (2009.01)

(52) U.S. Cl.
CPC ......... *H04B 7/18519* (2013.01); *H04W 84/06* (2013.01)

(58) Field of Classification Search
CPC ... H04W 84/06; H04W 24/10; H04W 56/001; H04B 7/18513; H04B 7/18541; H04B 7/185; H04B 7/1851
See application file for complete search history.

(56) References Cited

U.S. PATENT DOCUMENTS

| | | | |
|---|---|---|---|
| 2004/0152480 A1 | 8/2004 | Willars et al. | |
| 2015/0222294 A1 | 8/2015 | Eroz et al. | |

(Continued)

FOREIGN PATENT DOCUMENTS

| | | |
|---|---|---|
| CN | 104219718 A | 12/2014 |
| CN | 109690973 A | 4/2019 |

(Continued)

OTHER PUBLICATIONS

CATT, "Cell Selection and Reselection Issue in NTN System", 3GPP TSG-RAN WG2 Meeting #106, R2-1905873, May 13-17, 2019, Reno, USA.

(Continued)

*Primary Examiner* — Khalid W Shaheed
(74) *Attorney, Agent, or Firm* — Harness, Dickey & Pierce, P.L.C.

(57) ABSTRACT

An indication method and an indication device are provided. The method includes obtaining satellite parameters of a current satellite cell and one or more neighbor satellite cells, wherein the current satellite cell is a satellite cell where a terminal is located, the one or more neighbor satellite cells are satellite cells neighboring the current satellite cell; determining a basic list and a detailed list according to the satellite parameters of the current satellite cell and the neighbor satellite cells, wherein the basic list includes basic information of the neighbor satellites, and the detailed list includes detailed information of the neighbor satellites; sending the basic list and/or the detailed list to the terminal.

13 Claims, 4 Drawing Sheets

(56) References Cited

U.S. PATENT DOCUMENTS

2017/0374596 A1    12/2017  Benammar et al.
2019/0222303 A1*   7/2019   Lucky ................ H04B 7/18582
2019/0245614 A1    8/2019   Lucky et al.

FOREIGN PATENT DOCUMENTS

| CN | 109690974 A | 4/2019 |
| CN | 110429975 A | 11/2019 |
| CN | 110446156 A | 11/2019 |
| CN | 110582094 A | 12/2019 |
| WO | WO-2019/201810 A1 | 10/2019 |

OTHER PUBLICATIONS

CATT, "Considerations on NTN mobility", Agenda Item 20.2.4.1, 3GPP TSG-RAN WG3 #103, R3-190242, Feb. 25-Mar. 1, 2019, Athens, Greece.
Chinese Office Action dated Nov. 17, 2021 for CN Application No. 201911393963.1.
Extended European Search Report dated Dec. 12, 2022 for Application No. EP 20910511.3.
3GPP TR 38.821 V1.0.0 (Dec. 2019), 3rd Generation Partnership Project; Technical Specification Group Radio Access Network; Solutions for NR to support non-terrestrial networks (NTN) (Release 16).
Written Opinion and International Search Report for PCT/CN2020/134556 mailed Mar. 17, 2021.
Interdigital Inc., "Report on Email Discussion [107#62][NR/NTN] TP Mobility", Agenda Item 6.6.4.1, 3GPP RAN WG2 Meeting #107bis, R2-1913604, Oct. 14-18, 2019, Chongqing, China.

* cited by examiner

INDICATION METHOD AND INDICATION DEVICE

CROSS-REFERENCE TO RELATED APPLICATIONS

This application is a U.S. national phase application of a PCT Application No. PCT/CN2020/134556 filed on Dec. 8, 2020, which claims a priority to Chinese Patent Application No. 201911393963.1 filed in China on Dec. 30, 2019, the disclosures of which are incorporated in their entirety by reference herein.

TECHNICAL FIELD

The present disclosure relates to the field of communications technology, in particular, relates to an indication method and an indication device.

BACKGROUND

A low-earth-orbit-satellite broadband communication system has a large number of satellites and movement speeds of the satellites (the satellites orbit the Earth at a speed of about several kilometers per second) are high, resulting in a need for rapid and frequent handover of a terminal on the ground between different satellites. In order to provide a broadband data access service, the low-earth-orbit-satellite broadband communication system operates in a high frequency band, beams of both the satellite and the terminal have strong directivity. Whether the terminal can obtain important information such as movement of the satellite, antenna beam directivity, frequency configuration and beam configuration will affect a normal use of the system.

For a low-earth-orbit-satellite broadband internet constellation system, because of a high operating frequency band and in order to accurately establish a satellite-to-earth link, the terminal needs to be configured with an antenna with strong beam directivity, information such as antenna directivity parameters and satellite positions needs to be transmitted between systems.

The low-orbit-satellite mobile communication system in the related art, such as the Iridium satellite system, does not need to consider the beam directivity of the terminal and the like, so a neighboring-cell list and a neighboring cell parameter therein do not contain relevant information for calculating the beam directivity and thus is not applicable to the low-orbit-satellite mobile communication system.

Currently, there is a method to pre-bind an ephemeris and a configuration parameter list. In the method, a set of ephemeris data and configuration parameters are bound for the terminal in other ways before the terminal leaves the factory or is used, and are used for the terminal to calculate relevant handover parameters when the terminal hands over.

Although the method of pre-binding the configuration parameters such as the ephemeris can solve the problem of handover reference information to a certain extent, long-term maintenance of the information is difficult and timeliness is insufficient. On one hand, ephemeris information is affected by a time limit, and an error of the ephemeris information becomes larger if the ephemeris information is not updated for a long time; on the other hand, some time-varying parameters can not accurately reflect a current state, which will affect the use of the system.

SUMMARY

The embodiments of the present disclosure provide an indication method and an indication device, to solve the problem that ephemeris information in the related art is affected by time restriction, resulting in parameters being inaccurate.

In a first aspect, an indication method performed by a network device is provided in the embodiments of the present disclosure. The method includes: obtaining satellite parameters of a current satellite cell and one or more neighbor satellite cells, wherein the current satellite cell is a satellite cell where a terminal is located, the one or more neighbor satellite cells are one or more satellite cells neighboring the current satellite cell; determining a basic list and a detailed list according to the satellite parameters of the current satellite cell and the one or more neighbor satellite cells, wherein the basic list includes basic information of the one or more neighbor satellites, and the detailed list includes detailed information of the one or more neighbor satellites; sending the basic list to the terminal and/or sending the detailed list to the terminal.

Optionally, the one or more neighbor satellite cells include at least one of following: all satellite cells neighboring the current satellite cell; one or more satellite cells neighboring the current satellite cell, in a same movement direction as a movement direction of the current satellite cell, and located behind the current satellite cell; one or more satellite cells neighboring the current satellite cell, located in a same orbit plane as an orbit plane of the current satellite cell, having a same movement direction as a movement direction of the current satellite cell, and located behind the current satellite cell.

Optionally, sending the basic list to the terminal includes: sending the basic list through a broadcast message.

Optionally, sending the detailed list to the terminal includes: sending the detailed list to the terminal through a first signaling.

Optionally, the first signaling includes at least one of: Radio Resource Control (RRC) information, Downlink Control Information (DCI), and Medium Access Control Control Element (MAC CE).

Optionally, the basic list includes basic information of one or more neighbor satellites, the basic information includes at least one of following: a first neighbor satellite ephemeris configured to represent a relative ephemeris of a neighbor satellite with respect to a local satellite; a first neighbor satellite health status indication configured to indicate whether a health status of a neighbor satellite is a same as a health status of a local satellite; a first neighbor satellite polarization configuration configured to indicate whether polarization configuration of a neighbor satellite is a same as polarization configuration of a local satellite; a first neighbor satellite frequency configuration.

Optionally, the detailed list includes detailed information of one or more neighbor satellites, the detailed information includes at least one of following: a neighbor satellite identity ID; a second neighbor satellite ephemeris configured to indicate a moving trajectory of a neighbor satellite; a neighbor satellite beam configuration configured to indicate beam configuration and beam availability of a neighbor satellite; a second neighbor satellite frequency configuration configured to indicate an operating frequency of a neighbor satellite; a second neighbor satellite polarization configuration configured to represent a polarization state of each beam; a second neighbor satellite health status indication configured to indicate an available status of a neighbor satellite.

Optionally, before determining the detailed list, the method further includes: receiving a first request message from the terminal, wherein the first request message is configured to request detailed information of the one or more neighbor satellites; determining the detailed list includes: determining an information range of the detailed list according to the first request message.

In a second aspect, an indication method performed by a terminal is provided in the embodiments of the present disclosure. The method includes: receiving a basic list from a network device and/or receiving a detailed list from a network device, wherein the basic list includes basic information of one or more neighbor satellites, and the detailed list includes detailed information of the one or more neighbor satellites; performing cell selection or handover according to the basic list and/or the detailed list.

Optionally, receiving the basic list from the network device includes: receiving the basic list from the network device through a broadcast message.

Optionally, receiving the detailed list from the network device includes: receiving the detailed list from the network device through a first signaling.

Optionally, the first signaling includes at least one of following: Radio Resource Control (RRC) information, Downlink Control Information (DCI), Media Access Control Control Element (MAC CE).

Optionally, the basic list includes basic information of one or more neighbor satellites, the basic information includes at least one of following: a first neighbor satellite ephemeris configured to represent a relative ephemeris of a neighbor satellite with respect to a local satellite; a first neighbor satellite health status indication configured to indicate whether a health status of a neighbor satellite is a same as a health status of a local satellite; a first neighbor satellite polarization configuration configured to indicate whether polarization configuration of a neighbor satellite is a same as polarization configuration of a local satellite; a first neighbor satellite frequency configuration.

Optionally, the detailed list includes detailed information of one or more neighbor satellites, the detailed information includes at least one of following: a neighbor satellite identity ID; a second neighbor satellite ephemeris configured to indicate a moving trajectory of a neighbor satellite; a neighbor satellite beam configuration configured to indicate beam configuration and beam availability of a neighbor satellite; a second neighbor satellite frequency configuration configured to indicate an operating frequency of a neighbor satellite; a second neighbor satellite polarization configuration configured to represent a polarization state of each beam; a second neighbor satellite health status indication configured to indicate an available status of a neighbor satellite.

Optionally, before receiving the detailed list from the network device through the first signaling, the method further includes: sending a first request message to the network device, wherein the first request message is configured to request detailed information of the one or more neighbor satellites.

In a third aspect, a network device is provided in the embodiments of the present disclosure. The network device includes a first transceiver and a first processor. The first transceiver is configured to obtain satellite parameters of a current satellite cell and one or more neighbor satellite cells, wherein the current satellite cell is a satellite cell where a terminal is located, the one or more neighbor satellite cells are one or more satellite cells neighboring the current satellite cell. The first processor is configured to determine a basic list and a detailed list according to satellite parameters of the current satellite cell and the one or more neighbor satellite cells, wherein the basic list includes basic information of the one or more neighbor satellites, and the detailed list includes detailed information of the one or more neighbor satellites. The first transceiver is further configured to send the basic list to the terminal and/or send the detailed list to the terminal.

Optionally, the one or more neighbor satellite cells include at least one of following: all satellite cells neighboring the current satellite cell; one or more satellite cells neighboring the current satellite cell, in a same movement direction as a movement direction of the current satellite cell, and located behind the current satellite cell; one or more satellite cells neighboring the current satellite cell, located in a same orbit plane as an orbit plane of the current satellite cell, having a same movement direction as a movement direction of the current satellite cell, and located behind the current satellite cell.

Optionally, the first transceiver is further configured to send the basic list through a broadcast message.

Optionally, the first transceiver is further configured to send the detailed list to the terminal through a first signaling.

Optionally, the first signaling includes at least one of: Radio Resource Control (RRC) information, Downlink Control Information (DCI), and Medium Access Control Control Element (MAC CE).

Optionally, the basic list includes basic information of one or more neighbor satellites, the basic information includes at least one of following: a first neighbor satellite ephemeris configured to represent a relative ephemeris of a neighbor satellite with respect to a local satellite; a first neighbor satellite health status indication configured to indicate whether a health status of a neighbor satellite is a same as a health status of a local satellite; a first neighbor satellite polarization configuration configured to indicate whether polarization configuration of a neighbor satellite is a same as polarization configuration of a local satellite; a first neighbor satellite frequency configuration.

Optionally, the detailed list includes detailed information of one or more neighbor satellites, the detailed information includes at least one of following: a neighbor satellite identity ID; a second neighbor satellite ephemeris configured to indicate a moving trajectory of a neighbor satellite; a neighbor satellite beam configuration configured to indicate beam configuration and beam availability of a neighbor satellite; a second neighbor satellite frequency configuration configured to indicate an operating frequency of a neighbor satellite; a second neighbor satellite polarization configuration configured to represent a polarization state of each beam; a second neighbor satellite health status indication configured to indicate an available status of a neighbor satellite.

Optionally, the first transceiver is further configured to: receive a first request message from the terminal, wherein the first request message is configured to request detailed information of the one or more neighbor satellites; the first processor is further configured to determine an information range of the detailed list according to the first request message.

In a fourth aspect, a terminal is provided in the embodiments of the present disclosure. The terminal includes a second transceiver and a second processor. The second transceiver is configured to receive a basic list from a network device and/or receive a detailed list from a network device, wherein the basic list includes basic information of one or more neighbor satellites, and the detailed list includes detailed information of the one or more neighbor satellites.

The second processor is configured to perform cell selection or handover according to the basic list and/or the detailed list.

Optionally, the second transceiver is further configured to receive the basic list from the network device through a broadcast message.

Optionally, the second transceiver is further configured to receive the detailed list from the network device through a first signaling.

Optionally, the first signaling includes at least one of following: Radio Resource Control (RRC) information, Downlink Control Information (DCI), Media Access Control Control Element (MAC CE).

Optionally, the basic list includes basic information of one or more neighbor satellites, the basic information includes at least one of following: a first neighbor satellite ephemeris configured to represent a relative ephemeris of a neighbor satellite with respect to a local satellite; a first neighbor satellite health status indication configured to indicate whether a health status of a neighbor satellite is a same as a health status of a local satellite; a first neighbor satellite polarization configuration configured to indicate whether polarization configuration of a neighbor satellite is a same as polarization configuration of a local satellite; a first neighbor satellite frequency configuration.

Optionally, the detailed list includes detailed information of one or more neighbor satellites, the detailed information includes at least one of following: a neighbor satellite identity ID; a second neighbor satellite ephemeris configured to indicate a moving trajectory of a neighbor satellite; a neighbor satellite beam configuration configured to indicate beam configuration and beam availability of a neighbor satellite; a second neighbor satellite frequency configuration configured to indicate an operating frequency of a neighbor satellite; a second neighbor satellite polarization configuration configured to represent a polarization state of each beam; a second neighbor satellite health status indication configured to indicate an available status of a neighbor satellite.

Optionally, the second transceiver is further configured to send a first request message to the network device, wherein the first request message is configured to request detailed information of the one or more neighbor satellites.

In a fifth aspect, a network device is provided in the embodiments of the present disclosure. The network device includes: an obtaining module, configured to obtain satellite parameters of a current satellite cell and one or more neighbor satellite cells, wherein the current satellite cell is a satellite cell where a terminal is located, the one or more neighbor satellite cells are one or more satellite cells neighboring the current satellite cell; a determining module, configured to determine a basic list and a detailed list according to the satellite parameters of the current satellite cell and the one or more neighbor satellite cells, wherein the basic list includes basic information of the one or more neighbor satellites, and the detailed list includes detailed information of the one or more neighbor satellites; a first sending module, configured to send the basic list to the terminal and/or send the detailed list to the terminal.

Optionally, the one or more neighbor satellite cells include at least one of following: all satellite cells neighboring the current satellite cell; one or more satellite cells neighboring the current satellite cell, in a same movement direction as a movement direction of the current satellite cell, and located behind the current satellite cell; one or more satellite cells neighboring the current satellite cell, located in a same orbit plane as an orbit plane of the current satellite cell, having a same movement direction as a movement direction of the current satellite cell, and located behind the current satellite cell.

Optionally, the first sending module is further configured to send the basic list through a broadcast message.

Optionally, the first sending module is further configured to send the detailed list to the terminal through a first signaling.

Optionally, the first signaling includes at least one of: Radio Resource Control (RRC) information, Downlink Control Information (DCI), and Medium Access Control Control Element (MAC CE).

Optionally, the basic list includes basic information of one or more neighbor satellites, the basic information includes at least one of following: a first neighbor satellite ephemeris configured to represent a relative ephemeris of a neighbor satellite with respect to a local satellite; a first neighbor satellite health status indication configured to indicate whether a health status of a neighbor satellite is a same as a health status of a local satellite; a first neighbor satellite polarization configuration configured to indicate whether polarization configuration of a neighbor satellite is a same as polarization configuration of a local satellite; a first neighbor satellite frequency configuration.

Optionally, the detailed list includes detailed information of one or more neighbor satellites, the detailed information includes at least one of following: a neighbor satellite identity ID; a second neighbor satellite ephemeris configured to indicate a moving trajectory of a neighbor satellite; a neighbor satellite beam configuration configured to indicate beam configuration and beam availability of a neighbor satellite; a second neighbor satellite frequency configuration configured to indicate an operating frequency of a neighbor satellite; a second neighbor satellite polarization configuration configured to represent a polarization state of each beam; a second neighbor satellite health status indication configured to indicate an available status of a neighbor satellite.

Optionally, the network device further includes a second receiving module configured to receive a first request message from the terminal, wherein the first request message is configured to request detailed information of the one or more neighbor satellites; and a determining module configured to determine an information range of the detailed list according to the first request message.

In a sixth aspect, a terminal is provided in the embodiments of the present disclosure. The terminal includes a first receiving module, configured to receive a basic list from a network device and/or receive a detailed list from a network device, wherein the basic list includes basic information of one or more neighbor satellites, and the detailed list includes detailed information of the one or more neighbor satellites; a processing module, configured to perform cell selection or handover according to the basic list and/or the detailed list.

Optionally, the first receiving module is further configured to receive the basic list from the network device through a broadcast message.

Optionally, the first receiving module is further configured to receive the detailed list from the network device through a first signaling.

Optionally, the first signaling includes at least one of following: Radio Resource Control (RRC) information, Downlink Control Information (DCI), Media Access Control Control Element (MAC CE).

Optionally, the basic list includes basic information of one or more neighbor satellites, the basic information includes at least one of following: a first neighbor satellite ephemeris configured to represent a relative ephemeris of a neighbor satellite with respect to a local satellite; a first neighbor satellite health status indication configured to indicate whether a health status of a neighbor satellite is a same as a health status of a local satellite; a first neighbor satellite polarization configuration configured to indicate whether polarization configuration of a neighbor satellite is a same as polarization configuration of a local satellite; a first neighbor satellite frequency configuration.

Optionally, the detailed list includes detailed information of one or more neighbor satellites, the detailed information includes at least one of following: a neighbor satellite identity ID; a second neighbor satellite ephemeris configured to indicate a moving trajectory of a neighbor satellite; a neighbor satellite beam configuration configured to indicate beam configuration and beam availability of a neighbor satellite; a second neighbor satellite frequency configuration configured to indicate an operating frequency of a neighbor satellite; a second neighbor satellite polarization configuration configured to represent a polarization state of each beam; a second neighbor satellite health status indication configured to indicate an available status of a neighbor satellite.

Optionally, the terminal further includes a second sending module configured to send a first request message to the network device, wherein the first request message is configured to request detailed information of the one or more neighbor satellites.

In a seventh aspect, a communication device is provided in the embodiments of the present disclosure. The communication device includes a processor, a memory, and a program stored on the memory and executable on the processor, wherein when the program is executed by the processor, the processor implements steps of the indication method according to the first aspect.

In an eighth aspect, a terminal is provided in the embodiments of the present disclosure. The terminal includes a processor, a memory, and a program stored on the memory and executable on the processor, wherein, when the program is executed by the processor, the processor implements steps of the indication method according to the second aspect.

In a ninth aspect, a processor-readable storage medium is provided in the embodiments of the present disclosure. A program is stored on the processor-readable storage medium, wherein, when the program is executed by a processor, the processor implements steps of the indication method according to the first aspect, or steps of the indication method according to the second aspect.

In the embodiments of the present disclosure, the network device determines a basic list including basic information of one or more neighbor satellites and a detailed list including detailed information of the one or more neighbor satellites according to satellite parameters of current satellite cell and the one or more neighbor satellite cells neighboring the current satellite cell, and the terminal performs cell selection or handover according to the basic list and/or the detailed list. In this way, carrying the ephemeris information in the neighboring cell lists is more timely and effective, and a long-term error of locally binding ephemeris by the terminal can be reduced, configured parameters are more accurate, thereby ensuring that the system can be used normally.

BRIEF DESCRIPTION OF THE DRAWINGS

In order to more clearly illustrate technical solutions of embodiments of the present disclosure, accompanying drawings that need to be used in description of the embodiments of the present disclosure will be briefly described hereinafter, the drawings in the following description are only some embodiments of the present disclosure, and other drawings may be obtained from the drawings without paying creative labor by those skilled in the art.

DETAILED DESCRIPTION

Figure 1:
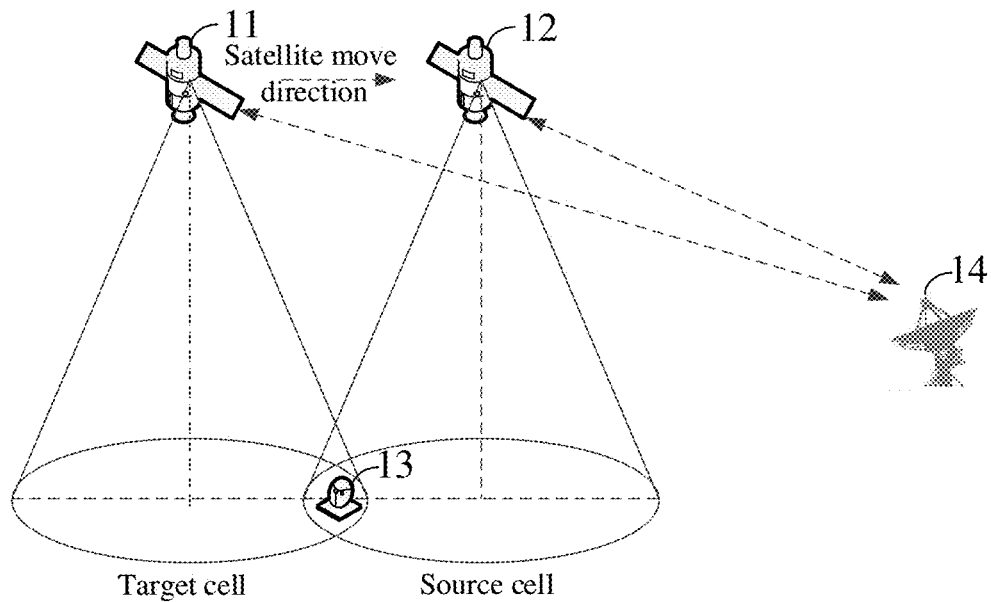
FIG. 1 is a schematic diagram of a communication system architecture provided by an embodiment of the present disclosure.

The technical solutions in the embodiments of the present disclosure will be clearly and completely described below with reference to the drawings in the embodiments of the present disclosure. Obviously, the described embodiments are part of the embodiments of the present disclosure, not all of the embodiments of the present disclosure. Based on the embodiments in the present disclosure, all other embodiments obtained by those skilled in the art without paying creative work fall within the protection scope of the present disclosure.

In the embodiments of that present disclosure, such words as "exemplary" or "such as" are used to indicate examples, illustration, or explanation. Any embodiment or design described as "exemplary" or "for example" in the embodiments of the present disclosure should not be construed as being more optional or advantageous than other embodiments or designs. Rather, use of the words such as "exemplary" or "such as" are intended to present relevant concepts in a specific manner.

Herein, terms such as "first" and "second" indicating relations are used only to distinguish the same names, not to imply relationship or an order between these names.

The techniques described herein are not limited to a fifth-generation (5th-generation, 5G) mobile communication system and a subsequent evolved communication system, and an evolved system (LTE-Advanced, LTE-A) that is not limited to LTE/LTE, and may also be used for various wireless communication systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Organic Frequency Division Multiple Access, OFDMA), single-carrier frequency-division multiple access (Single-Carrier Frequency-Division Multiple Access, SC-FDMA), and other systems.

Terms "system" and "network" are often used interchangeably. A CDMA system may implement radio technologies such as CDMA2000, Universal Terrestrial Radio Access (UTRA), and the like. UTRA includes wideband CDMA (Wideband Code Division Multiple Access, WCDMA) and other CDMA variants. A TDMA system may implement radio technologies such as the Global System for Mobile Communication (GSM). An OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, Flash-OFDM and the like. UTRA and E-UTRA are part of a Universal Mobile Telecommunications System (UMTS). LTE and more advanced LTE (e.g. LTE-A) are new UMTS versions using E-UTRA. UTRA, E-UTRA, UMTS, LTE, LTE-A, and GSM are described in documents from an organization called the Third-Generation Partnership Project (3GPP). CDMA2000 and UMB are described in documents from an organization called Third-Generation Partnership Project 2 (3GPP2). The techniques described herein may be used for both the above-mentioned systems and radio technologies, as well as for other systems and radio technologies.

In low orbit satellite communication, a terminal communicates with a network device through a satellite. Because an orbit altitude of the satellite is low, a movement speed of the satellite is fast, a large number of satellites are needed generally to form a constellation in order to realize a global coverage, and a user is served by the entirety of a constellation system. In case of a satellite with an orbit altitude of 1000 km, a visible duration of the satellite to a terrestrial terminal at the same position is about 10 minutes. In order to maintain an uninterrupted access service, the terrestrial terminal needs to perform fast and frequent handovers between different satellites.

Referring to FIG. 1 which shows a scenario where two satellite cells cover a terrestrial terminal. FIG. 1 shows a first satellite 11, a second satellite 12, a terminal 13, and a network device 14. The network device 14 may be a gateway station or a satellite base station. It should be noted that, In FIG. 1, ranges of satellite cells corresponding to the first satellite 11 and the second satellite 12 are indicated by solid lines, and the first satellite 11 and the second satellite 12 communicate with the network device 14 by radio communication. The terminal 13 and the network device 14 may adopt wired or wireless communications therebetween, which are not specifically limited in the embodiments of the present disclosure.

Continuing to refer to FIG. 1, which shows a movement direction of the first satellite 11 and the second satellite 12, the terminal 13 needs to hand over between the satellite cells corresponding to the two satellites due to satellite movement, and accordingly, the satellite cell corresponding to the first satellite 11 is a target cell, and the satellite cell corresponding to the second satellite 12 is a source cell.

Figure 2:
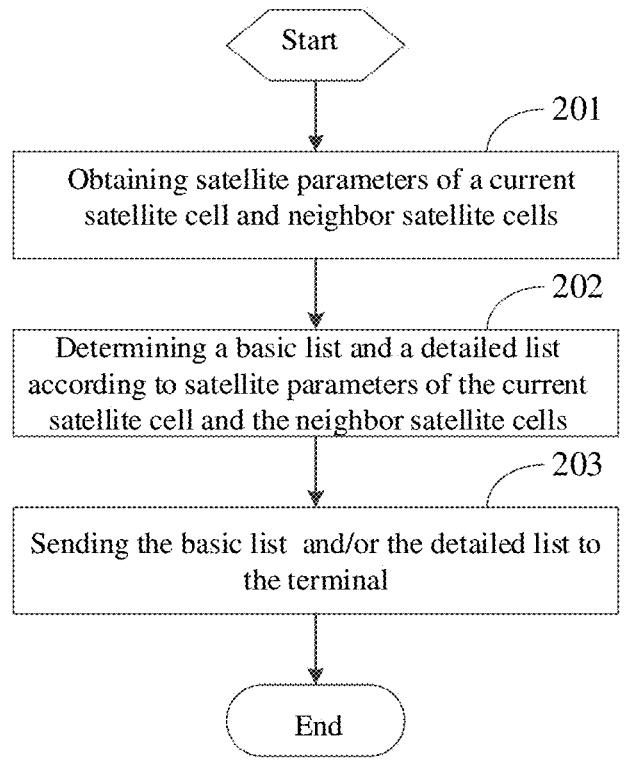
FIG. 2 is a first flowchart of an indication method provided by an embodiment of the present disclosure.

Referring to FIG. 2, an embodiment of the present disclosure provides an indication method, an entity for performing the method is a network device, and the network device may be a gateway station or a satellite base station, etc., and the method includes the following steps 201-203.

Step 201: obtaining satellite parameters of a current satellite cell and a neighbor satellite cell.

In the embodiment of the present disclosure, the current satellite cell is a satellite cell where the terminal is located, the neighbor satellite cell is a satellite cell adjacent to the current satellite cell. Satellite parameters of a current satellite and one or more neighbor satellites adjacent to the current satellite are obtained through the network device. The satellite parameters may include ephemeris information, beam configuration information, operating frequencies, polarization configuration, satellite health status indications, and the like.

Figure 3:
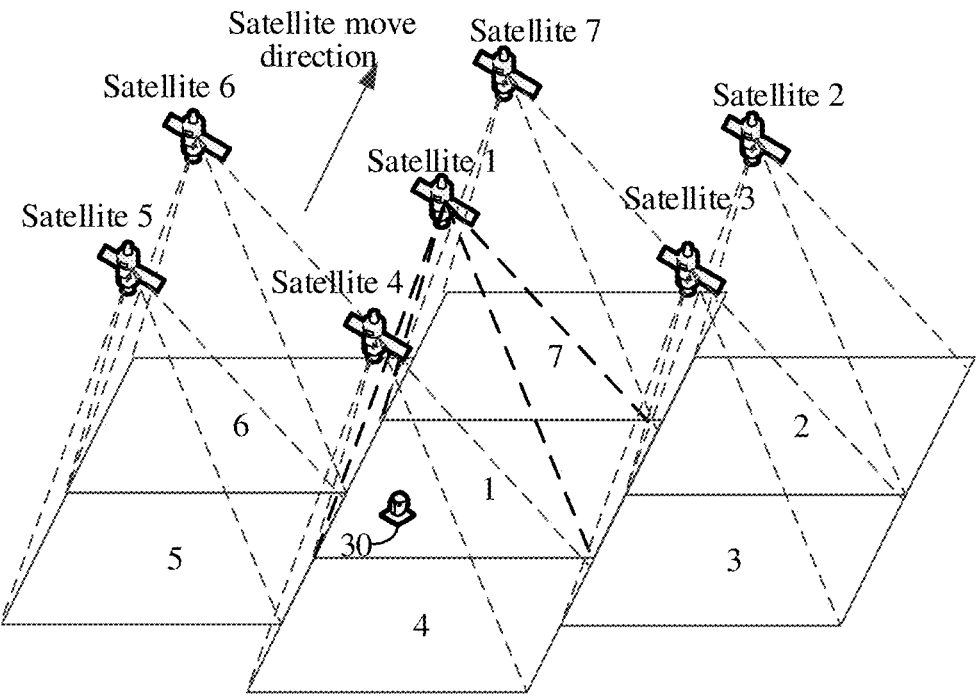
FIG. 3 is a schematic diagram of an application scenario provided by an embodiment of the present disclosure.

Referring to FIG. 3 which shows a low-earth-orbit mobile broadband internet constellation system, in which each satellite is assumed to be an independent cell, and a plurality of satellites cover adjacent regions as shown in FIG. 3. The terminal 30 is in the satellite cell corresponding to the satellite 1, that is, the satellite 1 corresponds to the current satellite cell.

The embodiments of the present disclosure provide three ways to determine the ranges of neighbor satellite cells.

First way: all satellite cells neighboring the current satellite cell are included in a list.

In the first way, the neighbor satellite cells include all the satellite cells adjacent to the current satellite cell. Taking FIG. 3 as an example, the satellite cells numbered 2 to 7 are all neighbor satellite cells, information of satellites 2 to 7 is included in a neighboring cell list.

Second way: neighboring cells in the rear of a current satellite movement direction are included in the list.

In this second way, the neighbor satellite cells include satellite cells that are adjacent to the current satellite cell, that are in the same movement direction, and that are located in the rear of the current satellite cell. Taking FIG. 3 as an example, the satellite cells numbered 3 to 5 are all neighbor satellite cells. Information of satellites 3 to 5 is included in the neighboring cell list.

Third way: adjacent satellites in the rear of the movement direction of the current satellite, having a same movement direction as that of the current satellite, and in a same orbit plane as that of the current satellite are included in the list.

In this third way, the neighbor satellite cells include the satellite cells adjacent to the current satellite cell, located on the same orbit plane as that of the current satellite cell, and having the same movement direction as that of the current satellite cell, and located behind the current satellite cell. Taking FIG. 3 as an example, only the satellite cell numbered 4 is the neighbor satellite cell, and information of the satellite 4 is included in the neighboring cell list.

Step 202: determining a basic list and a detailed list according to the satellite parameters of the current satellite cell and the neighbor satellite cells.

In the embodiment of the present disclosure, a network device formulate neighboring cell lists based on obtained satellite parameters, the neighboring cell lists include a basic list and a detailed list, wherein the basic list includes basic information of neighbor satellites, for example, may contain ephemeris information, beam configuration information, operating frequencies, polarization configuration, satellite health status indications, etc. of one or more satellites adjacent to the current satellite. The detailed list includes detailed information of neighbor satellites, contents of the list can be flexibly configured as required, including a support for multiple neighbor satellites and multiple types of parameter information, and the number can be flexibly expanded.

In some embodiments, the basic list may contain only parameters of neighbor satellites in the same orbital plane, and the basic list includes basic information of at least one neighbor satellite, and the basic information includes at least one of following: a first neighbor satellite ephemeris configured to represent a relative ephemeris of a neighbor satellite with respect to a local satellite; a first neighbor satellite health status indication configured to indicate whether health status of the neighbor satellite is the same as that of the local satellite, optionally, being the same as that of the local satellite is "1," and being different from that of the local satellite is "0"; a first neighbor satellite polarization configuration configured to indicate whether polarization configuration of the neighbor satellite is the same as that of the local satellite, optionally, being the same as that of the local satellite is "1," and being different from that of the local satellite is "0"; a first neighbor satellite frequency configuration, optionally, being represented by 2 bits in case of frequency four-color multiplexing.

In some embodiments, the detailed list includes detailed information of at least one neighbor satellite, the detailed information includes at least one of following: a neighbor satellite identity (ID) which is used to distinguish between satellites; a second neighbor satellite ephemeris configured to indicate a moving trajectory of a neighbor satellite; a neighbor satellite beam configuration, configured to indicate beam configuration and beam availability of the neighbor satellite; a second neighbor satellite frequency configuration, configured to indicate an operating frequency of the neighbor satellite, and support configuration of an operating frequency in respect of a beam; a second neighbor satellite polarization configuration, configured to represent a polarization state of each beam, optionally, '0' representing left-handed circular polarization and '1' representing right-handed circular polarization; a second neighbor satellite health status indication configured to indicate an available status of the neighbor satellite, optionally, through 1 bit, wherein "0" indicates that the neighbor satellite is unavailable, and "1" indicates that the neighbor satellite is in normal operation.

Step 203: sending the basic list and/or the detailed list to the terminal.

In the embodiment of the present disclosure, the network device may select to send the basic list to the terminal, or may select to send the detailed list to the terminal, or may select to send both the basic list and the detailed list to the terminal.

Specifically, the network device transmits the basic list through a broadcast message, and a transmission period of the basic list may be 80 ms, 160 ms, or the like, and may be set according to a system scheme.

Specifically, the network device sends the detailed list to the terminal through a first signaling, that is, sends the detailed list through a dedicated signaling, where the first signaling includes at least one of the following: Radio Resource Control (RRC) information, Downlink Control Information (DCI), Media Access Control Control Element (MAC CE).

Further, before determining the detailed list, the network device receives a first request message, such as an RRC request message, from the terminal, the first request message is used to request detailed information of the neighbor satellites. Accordingly, the network device determines an information range of the detailed list according to the first request message, so as to flexibly configure the contents of the detailed list according to the requirement of the terminal, and at the same time, the number of neighbor satellites can also be expanded according to the request of the terminal, so as to support, in the maximum extent, transmission of cell parameters of the entire network.

In the embodiment of the present disclosure, the information of the neighboring cell lists including the ephemeris information, the beam configuration information, the operating frequency, the polarization configuration, the satellite health state indication and the like of a satellite is designed, and the neighboring cell lists are divided into a basic list and a detailed list, the basic list is broadcast periodically by the network and the detailed list is transmitted through a dedicated signaling by the network, and relevant information is indicated to the terminal. On one hand, carrying the ephemeris information in the neighboring cell lists is more timely and effective, and a long-term error of locally binding ephemeris by the terminal can be reduced; on the other hand, the terminal can select to obtain the neighboring cell lists through a broadcast message or through an RRC request or through the broadcast message and the RRC request simultaneously according to needs, thereby increasing usage flexibility of the system.

Figure 4:
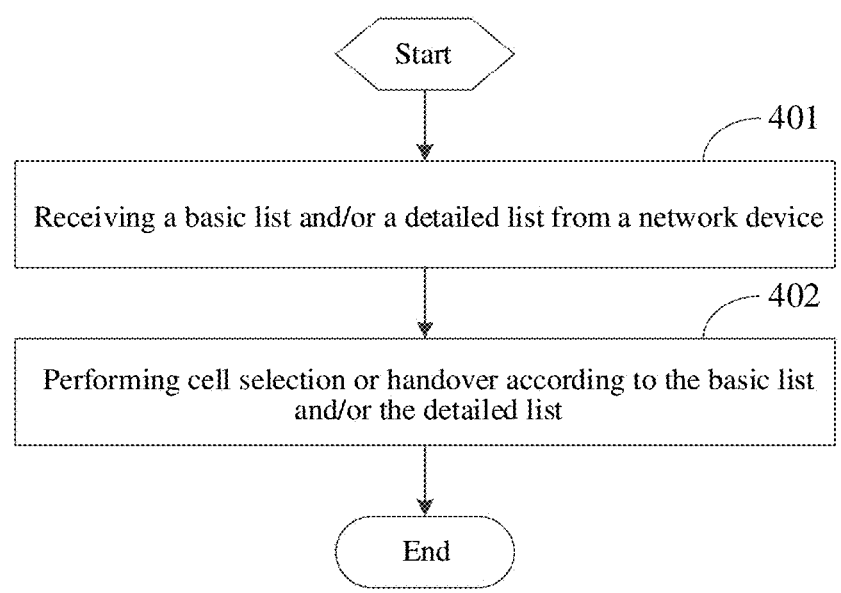
FIG. 4 is a second flowchart of an indication method provided by an embodiment of the present disclosure.

Referring to FIG. 4, an embodiment of the present disclosure provides an indication method, an entity of performing the method is a terminal, and the method includes the following steps 401-402.

Step 401: receiving a basic list and/or a detailed list from a network device.

In the embodiment of the present disclosure, the terminal receives neighboring cell lists from the network device, the basic list includes basic information of neighbor satellites, for example, may contain ephemeris information, beam configuration information, operating frequencies, polarization configuration, satellite health status indications, etc. of one or more satellites adjacent to the current satellite. The detailed list includes detailed information of neighbor satellites, contents of the list can be flexibly configured as required, including a support for multiple neighbor satellites and multiple types of parameter information, and the number can be flexibly expanded.

In some embodiments, the basic list may contain only parameters of neighbor satellites in the same orbital plane, and the basic list includes basic information of at least one neighbor satellite, and the basic information includes at least one of following: a first neighbor satellite ephemeris configured to represent a relative ephemeris of a neighbor satellite with respect to a local satellite; a first neighbor satellite health status indication configured to indicate whether health status of the neighbor satellite is the same as that of the local satellite, optionally, being the same as that of the local satellite is "1," and being different from that of the local satellite is "0"; a first neighbor satellite polarization configuration configured to indicate whether polarization configuration of the neighbor satellite is the same as that of the local satellite, optionally, being the same as that of the local satellite is "1," and being different from that of the local satellite is "0"; a first neighbor satellite frequency configuration, optionally, being represented by 2 bits in case of frequency four-color multiplexing.

In some embodiments, the detailed list includes detailed information of at least one neighbor satellite, the detailed information includes at least one of following: a neighbor satellite identity (ID) which is used to distinguish between satellites; a second neighbor satellite ephemeris configured to indicate a moving trajectory of a neighbor satellite; a neighbor satellite beam configuration, configured to indicate beam configuration and beam availability of the neighbor satellite; a second neighbor satellite frequency configuration, configured to indicate an operating frequency of the neighbor satellite, and support configuration of an operating frequency in respect of a beam; a second neighbor satellite polarization configuration, configured to represent a polarization state of each beam, optionally, '0' representing left-handed circular polarization and '1' representing right-handed circular polarization; a second neighbor satellite health status indication configured to indicate an available status of the neighbor satellite, optionally, through 1 bit, wherein "0" indicates that the neighbor satellite is unavailable, and "1" indicates that the neighbor satellite is in normal operation.

Specifically, the terminal receives the basic list through a broadcast message, and a transmission period of the basic list may be 80 ms, 160 ms, or the like, and may be set according to a system scheme.

Specifically, the terminal receives the detailed list from the network device through a first signaling, that is, receives the detailed list through a dedicated signaling, where the first signaling includes at least one of the following: RRC information, DCI, MAC CE.

Further, before receiving the detailed list from the network device through the first signaling, the terminal sends a first request message, such as an RRC request message, to the network device. The first request message is used to request detailed information of the neighbor satellites. Accordingly, the network device determines an information range of the detailed list according to the first request message, so as to flexibly configure the contents of the detailed list according to the requirement of the terminal, and at the same time, the number of neighbor satellites can also be expanded according to the request of the terminal, so as to support, in the maximum extent, transmission of cell parameters of the entire network.

In this way, the terminal can obtain the basic list and parameters from a broadcast message sent at the network side, and may also obtain the detailed list and parameters from the network side through an RRC request, and the terminal may flexibly select which specific method is adopted to obtain the neighboring cell lists and the parameters.

Step 402: performing cell selection or handover according to the basic list and/or the detailed list.

In the embodiment of the present disclosure, the terminal performs cell selection or handover by using parameters in the basic list and/or the detailed list. For example, the terminal uses the received neighboring cell list and parameters to perform cell selection and cell reselection in an idle state, and to perform the cell handover in an active state. In particular, after the terminal obtains the neighboring cell lists and information from the network device, the terminal deduces time, orientation and the like at which the terminal will enter a new cell, according to a current geographical position, a motion state and the ephemeris information of the neighboring cell, and instructs the terminal to configure relevant parameters and prepares to enter the new cell.

In the embodiment of the present disclosure, the information of the neighboring cell lists including the ephemeris information, the beam configuration information, the operating frequency, the polarization configuration, the satellite health state indication and the like of a satellite is designed, and the neighboring cell lists are divided into a basic list and a detailed list, the basic list is broadcast periodically by the network and the detailed list is transmitted through a dedicated signaling by the network, and relevant information is indicated to the terminal. On one hand, carrying the ephemeris information in the neighboring cell lists is more timely and effective, and a long-term error of locally binding ephemeris by the terminal can be reduced; on the other hand, the terminal can select to obtain the neighboring cell lists through a broadcast message or through an RRC request or through the broadcast message and the RRC request simultaneously according to needs, thereby increasing usage flexibility of the system.

Figure 5:
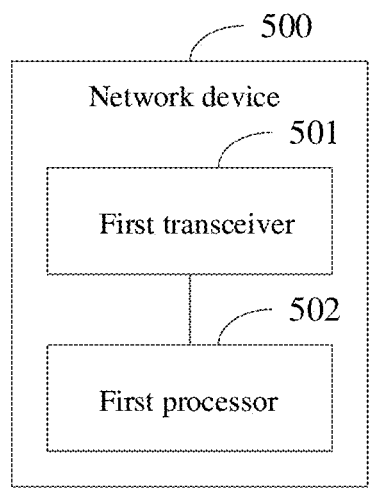
FIG. 5 is a structural schematic diagram of a network device provided by an embodiment of the present disclosure.

Referring to FIG. 5, an embodiment of the present disclosure provides a network device 500, which includes a first transceiver 501 and a first processor 502.

The first transceiver 501 is configured to obtain satellite parameters of a current satellite cell and a neighbor satellite cell, where the current satellite cell is a satellite cell where the terminal is located, the neighbor satellite cell is a satellite cell adjacent to the current satellite cell.

The first processor 502 is configured to determine a basic list and a detailed list according to the satellite parameters of the current satellite cell and the neighbor satellite cells; the basic list includes basic information of neighbor satellites, the detailed list includes detailed information of neighbor satellites.

The first transceiver 501 is further configured to send the basic list and/or the detailed list to the terminal.

Optionally, the neighbor satellite cells include at least one of following: all satellite cells neighboring the current satellite cell; satellite cells that are adjacent to the current satellite cell, in the same movement direction, and that are located in the rear of the current satellite cell; satellite cells adjacent to the current satellite cell, located in the same orbit plane as that of the current satellite cell, and having the same movement direction as that of the current satellite cell, and located in the rear of the current satellite cell.

Optionally, the first transceiver 501 is further configured to send the basic list to the terminal through a broadcast message.

Optionally, the first transceiver 501 is further configured to send the detailed list to the terminal through a first signaling.

Optionally, the first signaling includes at least one of: RRC information, DCI, and MAC CE.

Optionally, the basic list includes basic information of at least one neighbor satellite, and the basic information includes at least one of following: a first neighbor satellite ephemeris configured to represent a relative ephemeris of a neighbor satellite with respect to a local satellite; a first neighbor satellite health status indication configured to indicate whether health status of the neighbor satellite is the same as that of the local satellite; a first neighbor satellite polarization configuration configured to indicate whether polarization configuration of the neighbor satellite is the same as that of the local satellite; a first neighbor satellite frequency configuration.

Optionally, the detailed list includes detailed information of at least one neighbor satellite, the detailed information includes at least one of following: a neighbor satellite ID; a second neighbor satellite ephemeris configured to indicate a moving trajectory of a neighbor satellite; a neighbor satellite beam configuration, configured to indicate beam configuration and beam availability of the neighbor satellite; a second neighbor satellite frequency configuration, configured to indicate an operating frequency of the neighbor satellite; a second neighbor satellite polarization configuration, configured to represent a polarization state of each beam; a second neighbor satellite health status indication configured to indicate an available status of the neighbor satellite.

Optionally, the first transceiver 501 is further configured to receive a first request message from the terminal, the first request message is used to request detailed information of the neighbor satellites. The first processor 502 is further configured to determine an information range of the detailed list according to the first request message.

In the embodiment of the present disclosure, the information of the neighboring cell lists including the ephemeris information, the beam configuration information, the operating frequency, the polarization configuration, the satellite health state indication and the like of a satellite is designed, and the neighboring cell lists are divided into a basic list and a detailed list, the basic list is broadcast periodically by the network and the detailed list is transmitted through a dedicated signaling by the network, and relevant information is indicated to the terminal. On one hand, carrying the ephemeris information in the neighboring cell lists is more timely and effective, and a long-term error of locally binding ephemeris by the terminal can be reduced; on the other hand, the terminal can select to obtain the neighboring cell lists through a broadcast message or through an RRC request or through the broadcast message and the RRC request simultaneously according to needs, thereby increasing usage flexibility of the system.

Figure 6:
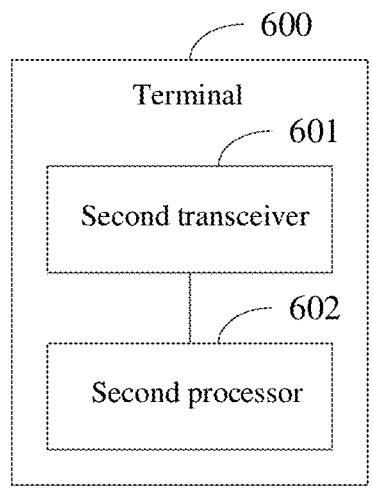
FIG. 6 is a structural schematic diagram of a terminal provided by an embodiment of the present disclosure.

Referring to FIG. 6, an embodiment of the present disclosure provides a terminal 600, which includes a second transceiver 601 and a second processor 602.

The second transceiver 601 is configured to receive a basic list and/or a detailed list from a network device, where the basic list includes basic information of neighbor satellites, and the detailed list includes detailed information of neighbor satellites. The second processor 602 is configured to perform cell selection or handover according to the basic list and/or the detailed list.

Optionally, the second transceiver 601 is further configured to receive the basic list from the network device through a broadcast message.

Optionally, the second transceiver 601 is further configured to receive the detailed list from the network device through a first signaling.

Optionally, the first signaling includes at least one of the following: RRC information, DCI, MAC CE.

Optionally, the basic list includes basic information of at least one neighbor satellite, and the basic information includes at least one of following: a first neighbor satellite ephemeris configured to represent a relative ephemeris of a neighbor satellite with respect to a local satellite; a first neighbor satellite health status indication configured to indicate whether health status of the neighbor satellite is the same as that of the local satellite; a first neighbor satellite polarization configuration configured to indicate whether polarization configuration of the neighbor satellite is the same as that of the local satellite; a first neighbor satellite frequency configuration.

Optionally, the detailed list includes detailed information of at least one neighbor satellite, and the detailed information includes at least one of following: a neighbor satellite ID; a second neighbor satellite ephemeris configured to indicate a moving trajectory of a neighbor satellite; a neighbor satellite beam configuration, configured to indicate beam configuration and beam availability of the neighbor satellite; a second neighbor satellite frequency configuration, configured to indicate an operating frequency of the neighbor satellite; a second neighbor satellite polarization configuration, configured to represent a polarization state of each beam; a second neighbor satellite health status indication configured to indicate an available status of the neighbor satellite.

Optionally, the second transceiver 601 is further configured to send a first request message to the network device, where the first request message is used to request the detailed information of neighbor satellites.

In the embodiment of the present disclosure, the information of the neighboring cell lists including the ephemeris information, the beam configuration information, the operating frequency, the polarization configuration, the satellite health state indication and the like of a satellite is designed, and the neighboring cell lists are divided into a basic list and a detailed list, the basic list is broadcast periodically by the network and the detailed list is transmitted through a dedicated signaling by the network, and relevant information is indicated to the terminal. On one hand, carrying the ephemeris information in the neighboring cell lists is more timely and effective, and a long-term error of locally binding ephemeris by the terminal can be reduced; on the other hand, the terminal can select to obtain the neighboring cell lists through a broadcast message or through an RRC request or through the broadcast message and the RRC request simultaneously according to needs, thereby increasing usage flexibility of the system.

Figure 7:
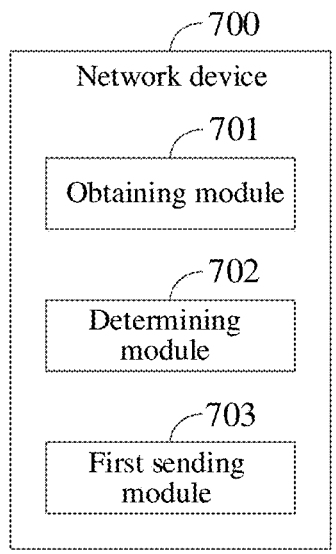
FIG. 7 is a second structural schematic diagram of a network device provided by an embodiment of the present disclosure.

Referring to FIG. 7, an embodiment of the present disclosure provides a network device 700, which includes an obtaining module 701, a determining module 702, and a sending module 703.

The obtaining module 701 is configured to obtain satellite parameters of a current satellite cell and a neighbor satellite cell, where the current satellite cell is a satellite cell where the terminal is located, the neighbor satellite cell is a satellite cell adjacent to the current satellite cell.

The determining module 702 is configured to determine a basic list and a detailed list according to the satellite parameters of the current satellite cell and the neighbor satellite cells; the basic list includes basic information of neighbor satellites, the detailed list includes detailed information of neighbor satellites.

The first sending module 703 is configured to send the basic list and/or the detailed list to the terminal.

Optionally, the neighbor satellite cells include at least one of following: all satellite cells neighboring the current satellite cell; satellite cells that are adjacent to the current satellite cell, in the same movement direction, and that are located in the rear of the current satellite cell; satellite cells adjacent to the current satellite cell, located in the same orbit plane as that of the current satellite cell, and having the same movement direction as that of the current satellite cell, and located in the rear of the current satellite cell.

Optionally, the first sending module is further configured to send the basic list to the terminal through a broadcast message.

Optionally, the first sending module is further configured to send the detailed list to the terminal through a first signaling.

Optionally, the first signaling includes at least one of: RRC information, DCI, and MAC CE.

Optionally, the basic list includes basic information of at least one neighbor satellite, and the basic information includes at least one of following: a first neighbor satellite ephemeris configured to represent a relative ephemeris of a neighbor satellite with respect to a local satellite; a first neighbor satellite health status indication configured to indicate whether health status of the neighbor satellite is the same as that of the local satellite; a first neighbor satellite polarization configuration configured to indicate whether polarization configuration of the neighbor satellite is the same as that of the local satellite; a first neighbor satellite frequency configuration.

Optionally, the detailed list includes detailed information of at least one neighbor satellite, the detailed information includes at least one of following: a neighbor satellite ID; a second neighbor satellite ephemeris configured to indicate a moving trajectory of a neighbor satellite; a neighbor satellite beam configuration, configured to indicate beam configuration and beam availability of the neighbor satellite; a second neighbor satellite frequency configuration, configured to indicate an operating frequency of the neighbor satellite; a second neighbor satellite polarization configuration, configured to represent a polarization state of each beam; a second neighbor satellite health status indication configured to indicate an available status of the neighbor satellite.

Optionally, the network device 700 further includes a second receiving module and a determining module.

The second receiving module is configured to receive a first request message from the terminal, the first request message is used to request detailed information of the neighbor satellites.

The determining module is further configured to determine an information range of the detailed list according to the first request message.

In the embodiment of the present disclosure, the information of the neighboring cell lists including the ephemeris information, the beam configuration information, the operating frequency, the polarization configuration, the satellite health state indication and the like of a satellite is designed, and the neighboring cell lists are divided into a basic list and a detailed list, the basic list is broadcast periodically by the network and the detailed list is transmitted through a dedicated signaling by the network, and relevant information is indicated to the terminal. On one hand, carrying the ephemeris information in the neighboring cell lists is more timely and effective, and a long-term error of locally binding ephemeris by the terminal can be reduced; on the other hand, the terminal can select to obtain the neighboring cell lists through a broadcast message or through an RRC request or through the broadcast message and the RRC request simultaneously according to needs, thereby increasing usage flexibility of the system.

Figure 8:
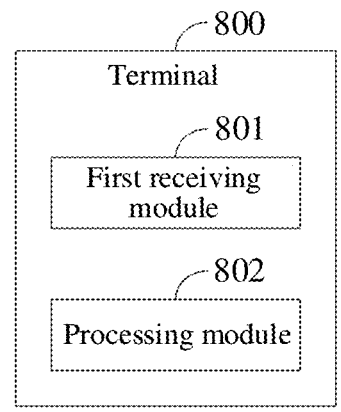
FIG. 8 is a second structural schematic diagram of a terminal provided by an embodiment of the present disclosure.

Referring to FIG. 8, an embodiment of the present disclosure provides a terminal 800 which includes a first receiving module 801 and a processing module 802.

The first receiving module 801 is configured to receive a basic list and/or a detailed list from a network device, where the basic list includes basic information of neighbor satellites, and the detailed list includes detailed information of neighbor satellites.

The processing module 802 is configured to perform cell selection or handover according to the basic list and/or the detailed list.

Optionally, the first receiving module is further configured to receive the basic list from the network device through a broadcast message.

Optionally, the first receiving module is further configured to receive the detailed list from the network device through a first signaling.

Optionally, the first signaling includes at least one of the following: RRC information, DCI, MAC CE.

Optionally, the basic list includes basic information of at least one neighbor satellite, and the basic information includes at least one of following: a first neighbor satellite ephemeris configured to represent a relative ephemeris of a neighbor satellite with respect to a local satellite; a first neighbor satellite health status indication configured to indicate whether health status of the neighbor satellite is the same as that of the local satellite; a first neighbor satellite polarization configuration configured to indicate whether polarization configuration of the neighbor satellite is the same as that of the local satellite; a first neighbor satellite frequency configuration.

Optionally, the detailed list includes detailed information of at least one neighbor satellite, and the detailed information includes at least one of following: a neighbor satellite ID; a second neighbor satellite ephemeris configured to indicate a moving trajectory of a neighbor satellite; a neighbor satellite beam configuration, configured to indicate beam configuration and beam availability of the neighbor satellite; a second neighbor satellite frequency configuration, configured to indicate an operating frequency of the neighbor satellite; a second neighbor satellite polarization configuration, configured to represent a polarization state of each beam; a second neighbor satellite health status indication configured to indicate an available status of the neighbor satellite.

Optionally, the terminal 800 further includes a second sending module, configured to send a first request message to the network device, where the first request message is used to request the detailed information of neighbor satellites.

In the embodiment of the present disclosure, the information of the neighboring cell lists including the ephemeris information, the beam configuration information, the operating frequency, the polarization configuration, the satellite health state indication and the like of a satellite is designed, and the neighboring cell lists are divided into a basic list and a detailed list, the basic list is broadcast periodically by the network and the detailed list is transmitted through a dedicated signaling by the network, and relevant information is indicated to the terminal. On one hand, carrying the ephemeris information in the neighboring cell lists is more timely and effective, and a long-term error of locally binding ephemeris by the terminal can be reduced; on the other hand, the terminal can select to obtain the neighboring cell lists through a broadcast message or through an RRC request or through the broadcast message and the RRC request simultaneously according to needs, thereby increasing usage flexibility of the system.

Figure 9:
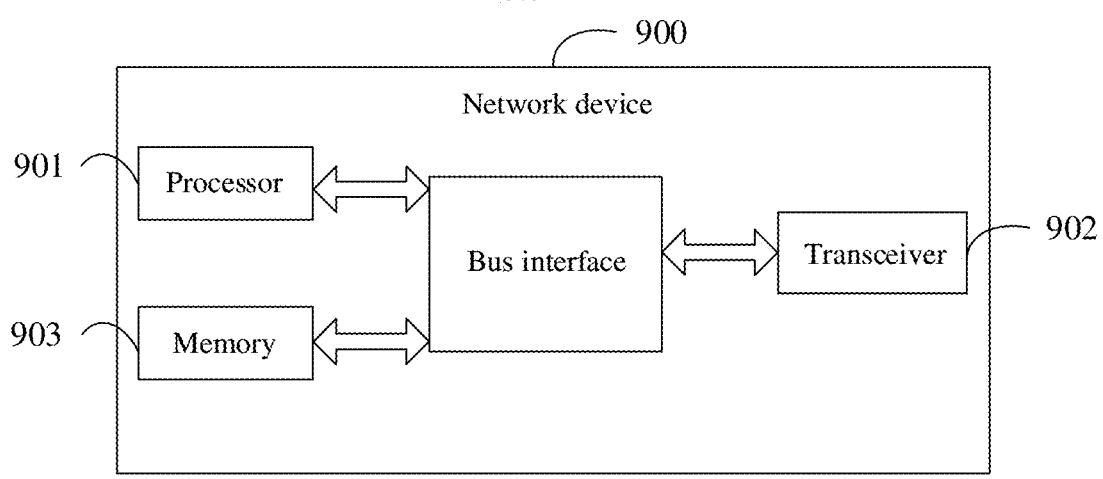
FIG. 9 is a structural schematic diagram of a network device provided by an embodiment of the present disclosure.

Referring to FIG. 9, an embodiment of the present disclosure provides a network device 900, which includes a processor 901, a transceiver 902, a memory 903, and a bus interface.

The processor 901 may be responsible for managing a bus architecture and general processing. The memory 903 may store data used by the processor 901 when performing operations.

In the embodiment of the present disclosure, the network device 900 may further include a program stored on the memory 903 and executable on the processor 901. When the program is executed by the processor 901, the processor 901 implements operations of the method provided in the embodiment of the present disclosure.

In FIG. 9, the bus architecture may include any number of interconnected buses and bridges, specifically various circuits such as one or more processors represented by the processor 901 and a memory represented by the memory 903 are linked together. The bus architecture may also link together various other circuits such as peripheral devices, regulators, and power management circuits, all of which are well known in the art, and therefore, will not be further described in the embodiments of the present disclosure. A bus interface provides an interface. The transceiver 902 may be a number of elements, including a transmitter and a receiver, for providing means for communicating with various other devices over a transmission medium.

Figure 10:
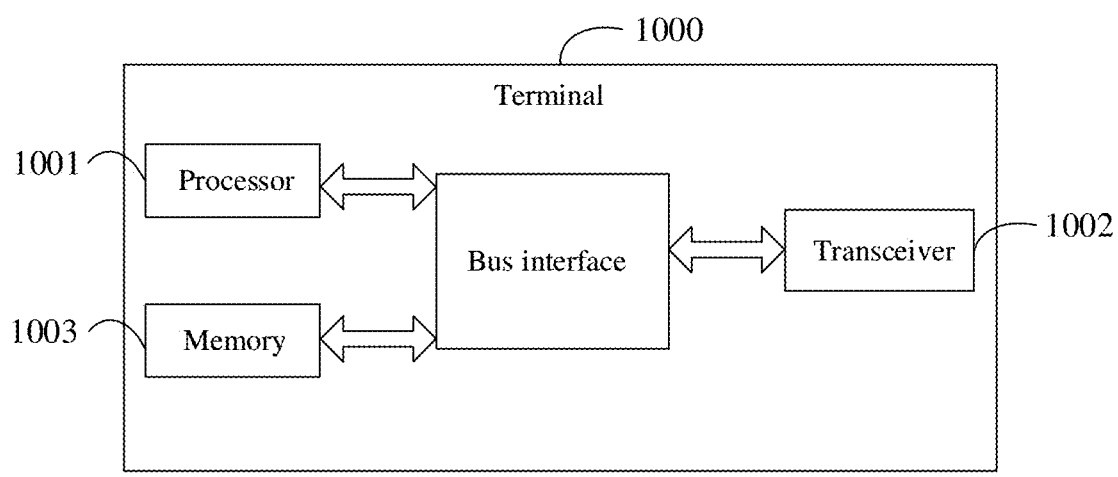
FIG. 10 is a structural schematic diagram of a terminal provided by an embodiment of the present disclosure.

Referring to FIG. 10, an embodiment of the present disclosure provides a terminal 1000 including a processor 1001, a transceiver 1002, a memory 1003, and a bus interface.

The processor 1001 may be responsible for managing a bus architecture and general processing. The memory 1003 may store data used by the processor 1001 when performing operations.

In the embodiment of the disclosure, the terminal 1000 may further include a program stored on the memory 1003 and executable on the processor 1001. When the program is executed by the processor 1001, the processor 1001 implements the steps of the method provided in the embodiment of the present disclosure.

In FIG. 10, the bus architecture may include any number of interconnected buses and bridges, specifically various circuits such as one or more processors represented by the processor 1001 and a memory represented by the memory 1003 are linked together. The bus architecture may also link together various other circuits such as peripheral devices, regulators, and power management circuits, all of which are well known in the art, and therefore, will not be further described in the embodiments of the present disclosure. A bus interface provides an interface. The transceiver 1002 may be a number of elements, including a transmitter and a receiver, for providing means for communicating with various other devices over a transmission medium.

The embodiments of the present disclosure also provide a processor-readable storage medium having stored thereon a program. When the program is executed by a processor, the processor implements processes of the method embodiments described above and can achieve the same technical effect. In order to avoid repeated description, detailed description thereof is not repeated here. The computer-readable storage medium is a read-only memory (Read-Only Memory, ROM), a random access memory (Random Access Memory, RMA), a magnetic disk or an optical disk, and the like.

It should be noted that the above divisions to modules of the network device and the terminal are only divisions in respect of logical functions, and the modules can be entirely or partially integrated into one physical entity in actual implementation, or can also be physically separated. In addition, all of the modules may be implemented in form of software invoked by a processing element, or all of the modules may be implemented in form of hardware; or, some of the modules may be implemented in form of software invoked by a processing element, some of the modules are implemented in form of hardware. For example, the determining module may be a separate processing element, or may be integrated in a chip of the device, or may also be stored in a memory of the device in form of program codes, functions of the above determining module is called and executed by a processing element of the above device. Implementation of the other modules is similar to the determining module. In addition, all or part of these modules may be integrated together or may be implemented independently. The processing element described herein may be an integrated circuit with a signal processing capability. In an implementation, the steps of the above methods or the above various modules may be performed by integrated logic circuits of hardware in a processor element or by instructions in form of software.

For example, each module, unit, sub-unit, or sub-module may be one or more integrated circuits configured to implement the above methods, such as one or more Application Specific Integrated Circuits (ASICs), or, one or more digital signal processors (DSPs), or one or more Field Programmable Gate Arrays (FPGAs), etc. In another example, when one of the above modules is implemented in the form of program codes invoked by a processing element, the processing element may be a general purpose processor, such as a Central Processing Unit (CPU) or other processors that can invoke program codes. As another example, these modules may be integrated together and implemented in the form of a system-on-a-chip (SOC).

Such terms as "first", "second", and the like in the specification and claims of the present application are used to distinguish similar objects and need not be used to describe a particular order or a sequential order. It should be understood that the terms used in this way may be interchanged where appropriate so that the embodiments of the present application described herein for example can be implemented in a sequence other than those illustrated or described herein. In addition, such terms as "including" and "having" and any variations thereof are intended to cover non-exclusive inclusions, for example, a process, a method, a system, a product or a device including a series of steps or units needs not be limited to those steps or units that are clearly listed, but may include other steps or units not explicitly listed or inherent to these processes, methods, products, or devices. In addition, use of "and/or" in the specification and claims means at least one of connected objects, such as A and/or B and/or C, including seven cases that a single A exists, a single B exists, a single C exists, A and B exist, B and C exist, A and C exist, and all of A, B and C exist. Similar, use of "at least one of A and B" in this specification and in the claims should be understood to mean "A alone, B alone, or both A and B."

It should be noted that such terms as "including", "comprising" or any other variation thereof are intended to encompass non-exclusive inclusions, so that a process, a method, an article or a device including a series of elements includes not only those elements, but also include other elements not explicitly listed, or includes elements inherent to such a process, a method, an article or a device. Without further limitation, if an element is defined after a statement "including one . . . ", then it is not excluded presence of another identical element in a process, a method, an article, or a device that includes the element.

The above description provides specific embodiments of the present application, but the protection scope of the present application is not limited thereto, and any change or replacement within the technical scope disclosed in the present application should be covered within the protection scope of the present application. Therefore, the protection scope of the present application should be consistent with the protection scope of the claims.

What is claimed is:

1. An indication method performed by a network device, comprising:
    obtaining satellite parameters of a current satellite cell and one or more neighbor satellite cells, wherein the current satellite cell is a satellite cell where a terminal is located, the one or more neighbor satellite cells are one or more satellite cells neighboring the current satellite cell;
    determining a basic list and a detailed list according to the satellite parameters of the current satellite cell and the one or more neighbor satellite cells, wherein the basic list comprises basic information of the one or more neighbor satellites, and the detailed list comprises detailed information of the one or more neighbor satellites;
    sending the basic list to the terminal through a broadcast message and/or sending the detailed list to the terminal through a first signaling, wherein the detailed list comprises detailed information of one or more neighbor satellites, the detailed information comprises at least one of following:
a neighbor satellite identity ID;
a second neighbor satellite ephemeris configured to indicate a moving trajectory of a neighbor satellite;
a neighbor satellite beam configuration configured to indicate beam configuration and beam availability of a neighbor satellite;
a second neighbor satellite frequency configuration configured to indicate an operating frequency of a neighbor satellite;
a second neighbor satellite polarization configuration configured to represent a polarization state of each beam;
a second neighbor satellite health status indication configured to indicate an available status of a neighbor satellite.

2. The method according to claim 1, wherein the one or more neighbor satellite cells comprise at least one of following:
all satellite cells neighboring the current satellite cell;
one or more satellite cells neighboring the current satellite cell, in a same movement direction as a movement direction of the current satellite cell, and located behind the current satellite cell;
one or more satellite cells neighboring the current satellite cell, located in a same orbit plane as an orbit plane of the current satellite cell, having a same movement direction as a movement direction of the current satellite cell, and located behind the current satellite cell.

3. The method according to claim 1, wherein the first signaling comprises at least one of:
Radio Resource Control (RRC) information, Downlink Control Information (DCI), and Medium Access Control Control Element (MAC CE).

4. The method according to claim 1, wherein the basic list comprises basic information of one or more neighbor satellites, the basic information comprises at least one of following:
a first neighbor satellite ephemeris configured to represent a relative ephemeris of a neighbor satellite with respect to a local satellite;
a first neighbor satellite health status indication configured to indicate whether a health status of a neighbor satellite is a same as a health status of a local satellite;
a first neighbor satellite polarization configuration configured to indicate whether polarization configuration of a neighbor satellite is a same as polarization configuration of a local satellite;
a first neighbor satellite frequency configuration.

5. The method according to claim 1, wherein, before determining the detailed list, the method further comprises:
receiving a first request message from the terminal, wherein the first request message is configured to request detailed information of the one or more neighbor satellites;
determining the detailed list comprises:
determining an information range of the detailed list according to the first request message.

6. An indication method performed by a terminal, comprising:
receiving a basic list from a network device through a broadcast message and/or receiving a detailed list from a network device through a first signaling, wherein the basic list comprises basic information of one or more neighbor satellites, and the detailed list comprises detailed information of the one or more neighbor satellites;
performing cell selection or handover according to the basic list and/or the detailed list,
wherein the detailed list comprises detailed information of one or more neighbor satellites, the detailed information comprises at least one of following:
a neighbor satellite identity ID;
a second neighbor satellite ephemeris configured to indicate a moving trajectory of a neighbor satellite;
a neighbor satellite beam configuration configured to indicate beam configuration and beam availability of a neighbor satellite;
a second neighbor satellite frequency configuration configured to indicate an operating frequency of a neighbor satellite;
a second neighbor satellite polarization configuration configured to represent a polarization state of each beam;
a second neighbor satellite health status indication configured to indicate an available status of a neighbor satellite.

7. The method according to claim 6, wherein the first signaling comprises at least one of following:
Radio Resource Control (RRC) information, Downlink Control Information (DCI), Media Access Control Control Element (MAC CE).

8. The method according to claim 6, wherein the basic list comprises basic information of one or more neighbor satellites, the basic information comprises at least one of following:
a first neighbor satellite ephemeris configured to represent a relative ephemeris of a neighbor satellite with respect to a local satellite;
a first neighbor satellite health status indication configured to indicate whether a health status of a neighbor satellite is a same as a health status of a local satellite;
a first neighbor satellite polarization configuration configured to indicate whether polarization configuration of a neighbor satellite is a same as polarization configuration of a local satellite;
a first neighbor satellite frequency configuration.

9. The method according to claim 6, wherein before receiving the detailed list from the network device through the first signaling, the method further comprises:
sending a first request message to the network device, wherein the first request message is configured to request detailed information of the one or more neighbor satellites.

10. A network device, comprising:
a processor, a memory, and a program stored on the memory and executable on the processor, wherein when the program is executed by the processor, the processor implements steps of the indication method according to claim 1.

11. A terminal, comprising:
a processor, a memory, and a program stored on the memory and executable on the processor, wherein, when the program is executed by the processor, the processor implements steps of the indication method according to claim 6.

12. A non-transitory processor-readable storage medium, comprising:
a program stored on the processor-readable storage medium, wherein, when the program is executed by a processor, the processor implements steps of the indication method according to claim 1.

13. A non-transitory processor-readable storage medium, comprising:
   a program stored on the processor-readable storage medium, wherein, when the program is executed by a processor, the processor implements steps of the indication method according to claim 6.

* * * * *